Jan. 7, 1930.　　　L. F. NOCK　　　1,742,721
MOLD DRYING APPARATUS
Filed Aug. 25, 1927
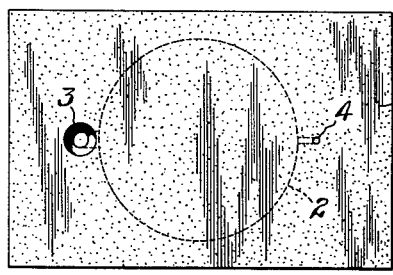
Fig. 2.
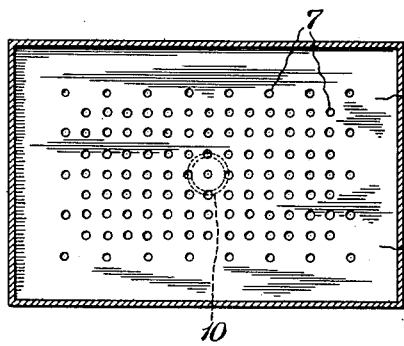
Fig. 3
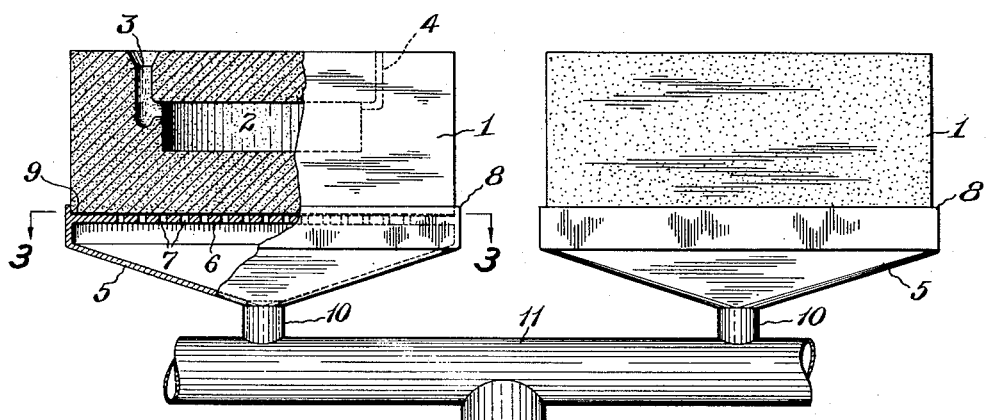
Fig. 1.
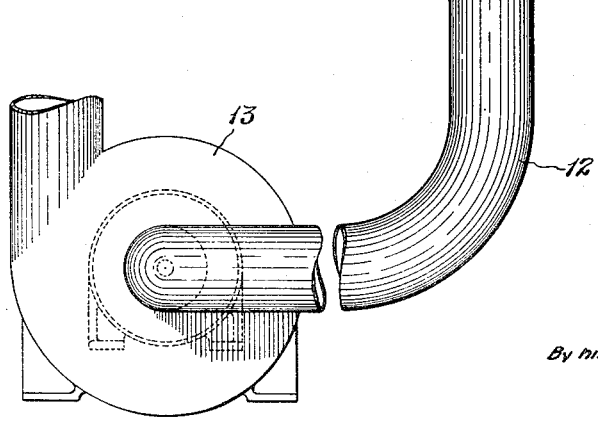
INVENTOR:
LEO F. NOCK
By his atty.

Patented Jan. 7, 1930

1,742,721

UNITED STATES PATENT OFFICE

LEO F. NOCK, OF ELYRIA, OHIO

MOLD-DRYING APPARATUS

Application filed August 25, 1927. Serial No. 215,408.

My invention pertains to improvements in molds and the process of preparing molds and more specifically to a procedure for expediting the drying of the porous material of which the mold is composed.

Irrespective of the substance of the formed material which determines the shape of a mold cavity, it must be absolutely dry before effecting the pouring. While the drying period naturally varies according to the thickness of the mold material, it is known occasionally to have required a duration of forty-eight hours, even while subjected to artificial heat.

I have greatly shortened the drying time by positively establishing an air current through the mold material. Although air under pressure may be employed to dry the mold material, which, for instance, may be made of plaster of Paris or the like, I find that this not so satisfactory in practice, due to the difficulty of establishing the communication of air to all parts of the interior of the mold, it being very difficult to avoid leakage of air attempted to be introduced, and to cause the air to uniformly penetrate all parts of the mold material.

I, therefore, employ air at atmospheric pressure drawn through the mold by the effect of a so-called vacuum, or "suction" effect, produced by a "suction" pump applied to one side of the mold, which draws the mold tightly to the connecting element leading to the pump by weight of atmosphere all over the exterior surface of the mold.

An object of my invention is to accomplish thorough drying of all portions of a prepared mold made of initially wet porous material, such as plaster of Paris or the like Another object of my invention is to accomplish a draft of air from the porous material of a mold without undue leakage of air at the point of junction with the pump or other means for effecting the draft of air through the material.

Another object of my invention is to accomplish drying of a prepared mold of initially wet porous material in a shorter time than has heretofore been considered practical.

Another object of my invention is to dry an initially wet porous mold without danger of injury thereto.

Other objects of my invention and the invention itself will become more apparent from the following description of a preferred embodiment of my invention, and in which description reference will be had to the accompanying drawings illustrating the said embodiment.

Referring to the drawing:

Figure 1 is an elevation of apparatus including a mold embodying my invention and showing the mold partly in section.

Figure 2 is a top plan of the mold.

Figure 3 is a transverse section on line 3—3 of Figure 1.

A mold 1 of porous material, for instance comprising plaster of Paris, includes a mold cavity 2, sprue 3 and vent 4. Figure 1 discloses two of a gang of molds 1 resting upon hollow supports 5, having bottoms 6 supplied with holes 7. The edge of the member 6 may be fashioned as an upstanding flange 8 and in some instances a gasket 9 might advantageously be employed. The hollow members 5 connect, through pipes 10, with a manifold 11, which is connected by means of a conduit 12 with an exhaust fan 13. The process is preferably carried out in a heated room so that the air drawn through the mold is warmed.

The molds which in an initially wet condition are placed onto the bottoms 6 for the supports 5, the bottoms and the edge flange 8 being so formed as to snugly receive the bottom portion of the mold, the gasket 9 being previously put in place around the border portion of the bottom. The inner engaging surfaces of the mold gaskets and bottom are preferably weighted either preliminarily or by the wet mold seated thereon. The suction pump, being started, will draw air from the atmosphere surrounding the top of the mold into the mold interior towards the foraminated bottom plate 6 and into the manifold 11, conduit 12, through the pump 13. The pump 13 is capable of producing a sufficient reduction in the hollow support 5 that pressure of atmosphere exerted on the top and sides of the mold will press it downward almost with the full weight of atmosphere and this will insure a very good fluid tight seal against leakage of air direct from atmosphere past the mold. The greater the difference in pressure effected within the recessed support 5 and atmosphere, the greater will be the sealing effort tending to prevent by-passing of air into the hollow support and without passing through the porous material of the mold to be dried.

Having thus described my invention in a preferred embodiment, I am aware that numerous and extensive departures may be made from the embodiment herein illustrated and described, but without departing from the spirit of my invention.

I claim:—

In a drying mechanism for initially wet porous molds containing an interiorly disposed mold cavity, a hollow platform having a foraminous upper wall forming a supporting plate for the mold, said platform having short upstanding border flanges surrounding the mold and in sealing contact with its lower lateral sides only, air exhausting means continuously operative to reduce the pressure within the platform to sub-atmospheric pressure, a border gasket on the platform within the flanges supporting the mold on the platform but out of contact therewith, whereby air from atmosphere surrounding most of the lateral and upper sides of the mold will be drawn inwardly and downwardly to substantially uniformly dry all portions of the mold surrounding the cavity, but without effecting collapsing pressure thereon.

Signed by me, this 18th day of March, 1927.

LEO F. NOCK.